United States Patent Office 3,474,671
Patented Oct. 28, 1969

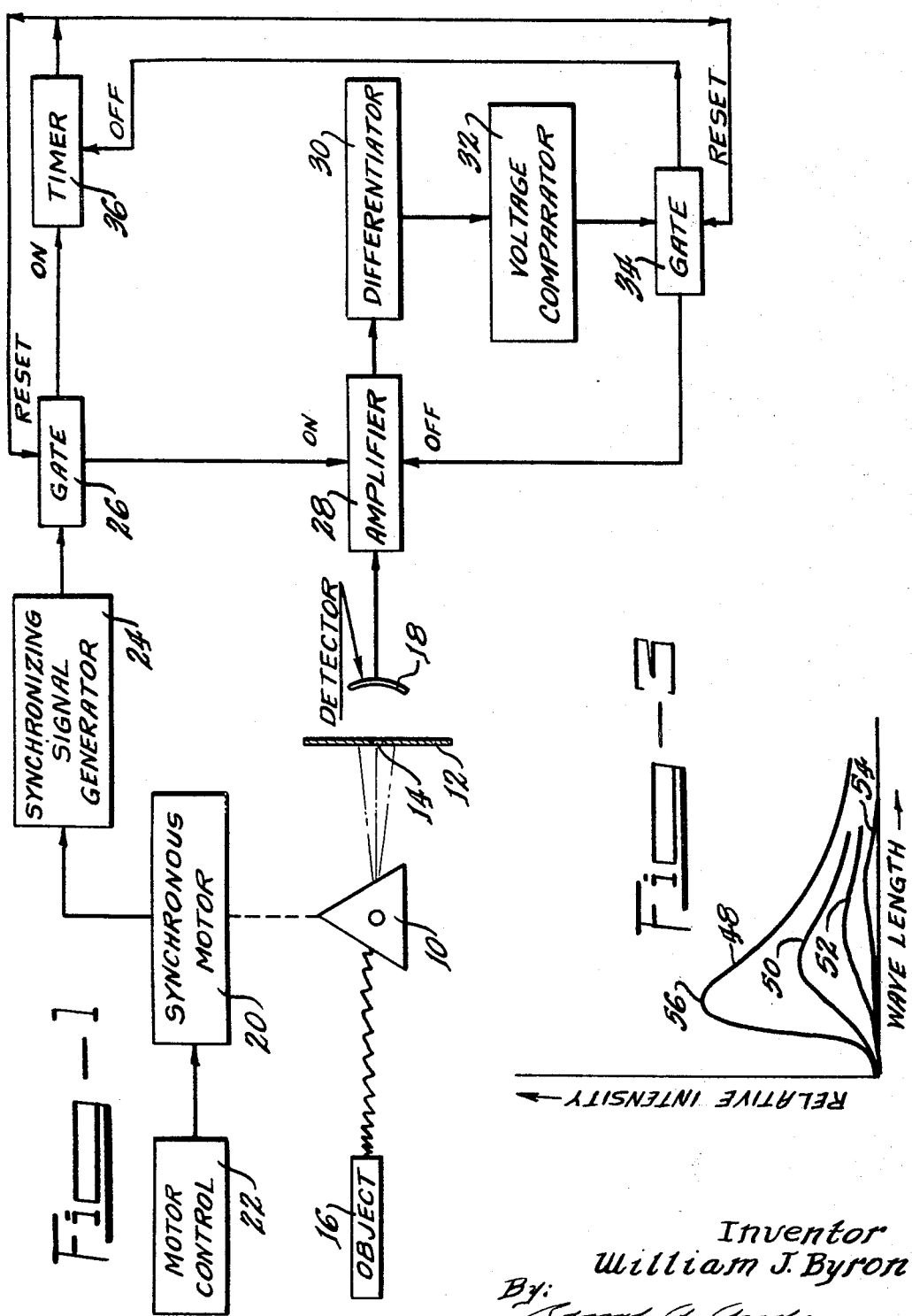

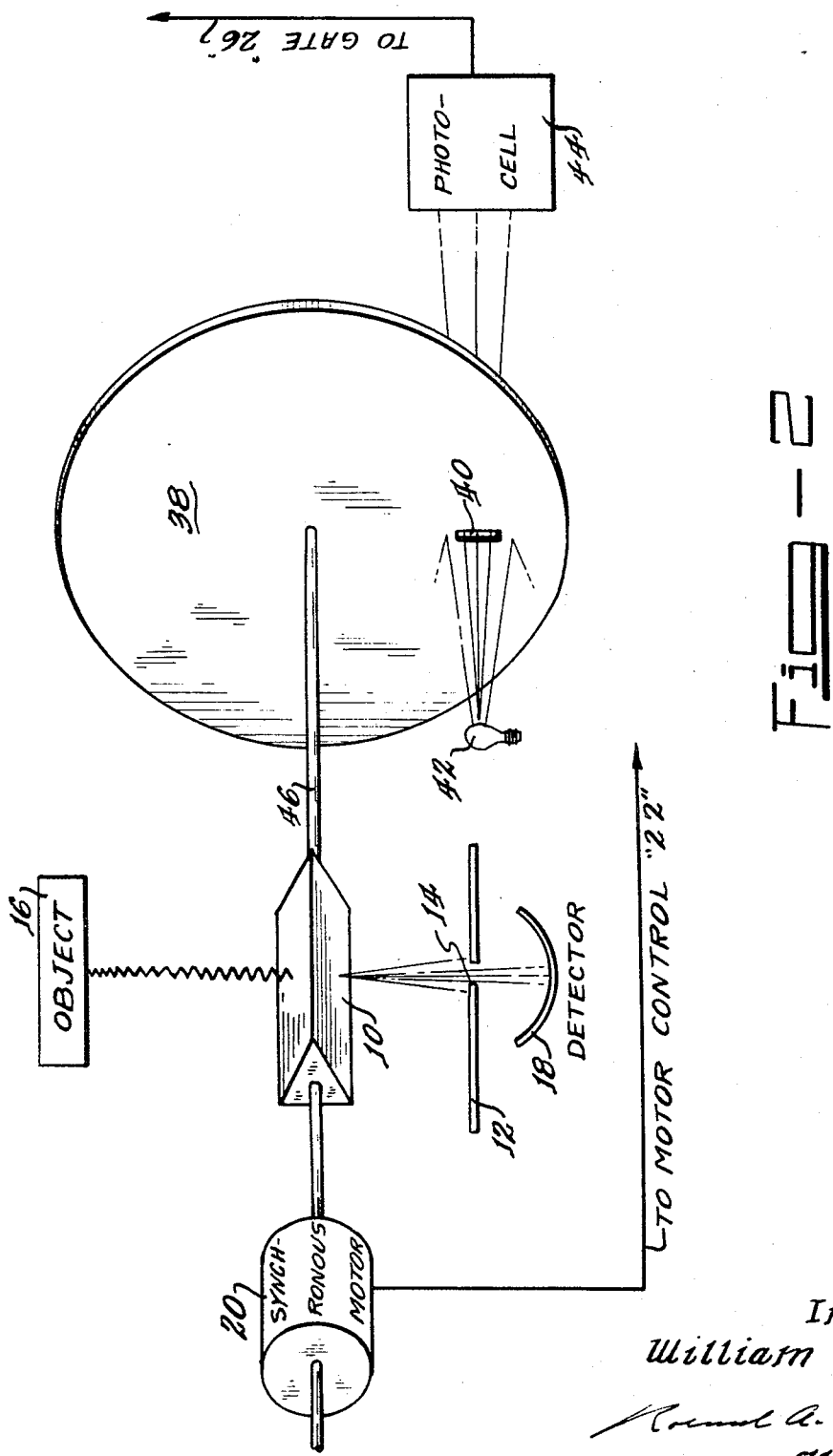

3,474,671
DEVICE FOR MEASURING THE TEMPERATURE OF A BODY UTILIZING THE INFRARED ENERGY RADIATION THEREFROM
William J. Byron, Idaho Falls, Idaho, assignor to the United States of America as represented by the United States Atomic Energy Commission
Filed Mar. 14, 1968, Ser. No. 712,974
Int. Cl. G01k *11/00;* G01j *5/60*
U.S. Cl. 73—355    5 Claims

ABSTRACT OF THE DISCLOSURE

A device for measuring the temperature of a body includes an infrared detector mounted to measure the intensity of infrared energy radiated from the body. A rotatable prism interposed of the body and the detector generates a continuous spectrum of the infrared energy radiated from the body. A member having a slit therethrough interposed between the prism and the detector admits a narrow wavelength band of the infrared radiation contained in the continuous spectrum to the detector. A motor drives the prism to sweep the continuous spectrum of infrared radiation past the slit in the member. An integrator integrates the output of the detector and a timer measures the time interval between the inception of the sweep of the continuous infrared spectrum and the polarity reversal output of the differentiator, which time interval is a measure of the temperature of the body.

CONTRACTURAL ORIGIN OF THE INVENTION

The invention described herein was made in the course of, or under, a contract with the United States Atomic Energy Commission.

BACKGROUND OF THE INVENTION

The present invention relates to temperature-measuring devices and more particularly to devices for measuring the temperature of a body utilizing the infrared energy radiation therefrom.

It is often desirable to ascertain the temperature of a body remotely. This is especially true when the body is situated in a field of nuclear radiation. Quite often such a body is also at an elevated temperature. Present devices accomplish this measurement by utilizing either an optical pyrometer or thermocouples. Both of these devices have undesirable characteristics. The reliability of the standard thermocouple decreases as the temperature of the object to which it is attached becomes elevated and this is particularly true when the thermocouple is also subjected to reactor-induced radiation. Optical pyrometry matches color temperature with a heated filament and is useful only for relatively stable sample temperatures.

Accordingly, it is one object of the present invention to provide an improved device for the measurement of the temperature of an object.

It is another object of the present invention to provide a device responsive to infrared energy radiation from a body to determine the temperature of the body.

It is another object of the present invention to provide a device capable of improved remote measurement of the temperature of a body.

It is another object of the present invention to provide a device having a fast response to temperature changes in a body.

Other objects of the present invention will become more apparent as the detailed description proceeds.

SUMMARY OF THE INVENTION

In general, the apparatus of the present invention comprises means for generating a continuous spectrum of the infrared energy radiated by a body. Means are provided for detecting the wavelength of the maximum-intensity infrared radiation contained in the continuous spectrum, which wavelength is a measure of the temperature of the body.

BRIEF DESCRIPTION OF THE DRAWINGS

Further understanding of the present invention may best be obtained from considering the accompanying drawings wherein:

FIG. 1 is a schematic diagram of the preferred embodiment of an apparatus for accomplishing the present invention.

FIG. 2 is a detailed schematic diagram of a portion of the apparatus of FIG. 1.

FIG. 3 is a graphical plot of typical spectral curves for black body radiation of a specimen body.

DESCRIPTION OF THE PREFERRED EMBODIMENT

In FIG. 1 a rotatable prism 10 is interposed between a member 12 having a slit 14 therethrough and a body 16 whose temperature is to be ascertained. A detector 18 is mounted on the side of member 12 opposite from prism 10. The prism 10 is mounted to intercept the infrared energy radiating from the body 16 and generate a continuous spectrum of this infrared energy, as hereinafter will be appreciated. The infrared detector 18 and the slit 14 in member 12 are aligned with respect to the prism 10 so that infrared radiation from the prism 10 passes through the slit 14 onto the detector 18.

A synchronous motor 20 responsive to a motor controller 22 drives the prism 10 at a relatively constant rate of speed, causing the heretofore mentioned continuous spectrum of infrared energy to be scanned past the slit 14. A synchronized signal generator 24 generates a signal responsive to the angular rotational position of the prism 10 at the inception of the scan of the continuous spectrum of infrared radiation past the slit 14. The signal from generator 24 is fed via a gate 26 to bias on an amplifier 28. The amplifier 28 has its input coupled to the output of the infrared detector 18. The output from amplifier 28 is fed to a differentiator 30. A voltage comparator 32 coupled to the output of differentiator 30 detects the polarity reversal in the differentiated ouput signal of differentiator 30. Responsive to this detector polarity reversal signal, voltage comparator 32 via gate 34 biases off amplifier 28. The output from gate 26 is also fed to a timer 36, as is the output from gate 34.

The synchronized signal generator 24 of FIG. 1 is shown in detail in FIG. 2. Basically, it comprises a light-shielding wheel 38 having a slot 40 cut therethrough. A light source 42 is mounted on one side of the wheel 38 and a photocell 44 is mounted on the other side. The light source and photocell are aligned so that light from the source 42 will pass through the slot 40 onto the photocell 44. The wheel 38 is mounted on the drive shaft 46 of the motor 20 so as to rotate therewith. The wheel 38 has an angular position on the drive shaft such that the slot 40 is positioned between the light source 42 and photocell 44 when the inception of the scan of the continuous infrared spectrum is passing between the slit 14 of member 12.

Further understanding of the aforedescribed device may be obtained by considering FIG. 3. FIG. 3 is a graphical representation of spectral curves for black body radiation from a specimen body. Each of the curves 48, 50, 52 and 54 represents the continuous spectrum of infrared energy emitted from a specimen body. It is to be noted that each of the curves has a characteristic maximum amplitude hump and that this characteristic hump occurs at differing wavelengths for each curve.

Each of the curves 48, 50, 52 and 54 represents the specimen body at a differing temperature. Thus, by identifying the continuous infrared spectrum curve, one may identify the temperature of the specimen body. The apparatus of the present invention identifies the particular continuous spectrum curve for the specimen body 16 to provide a measure of the temperature thereof.

The infrared radiation emanating from the body 16 passes to the prism 10 which breaks up the infrared energy to generate therefor a continuous spectrum. The synchronous motor 20 causes the prism 10 to rotate, thereby sweeping the continuous spectrum from the prism 10 past the slit 14 in member 12. Thus, assuming a temperature of body 16 sufficient to generate a continuous spectrum similar to that shown by curve 48 in FIG. 3, the detector 18 will first see infrared radiation of increasing wavelength and increasing intensity and then infrared radiation of decreasing intensity and increasing wavelength after the maximum intensity at hump 56 has been passed. As hereinbefore described, the amplifier 28 is biased on and the timer 36 is gated on at the inception of the scan of the continuous spectrum past the slit 14 in member 12. The differentiator 30 differentiates the output of amplifier 28 to provide a time derivative thereof. The differentiated signal output from differentiator 30 reverses polarity at the maximum intensity point of the continuous spectrum, that is, point 56 in curve 48, where the curve intensity commences to decrease for increasing wavelength. This change in polarity in the differentiated output signal of differentiator 30 is detected by the conventional voltage comparator 32 and used to bias off amplifier 28 and gate off timer 36. The time elapsed as measured by timer 36 in the time required for the scan of curve 48 to reach from the origin thereof to the point 56. Thus, the elapsed time measured by timer 36 is a direct measure of the maximum intensity of infrared radiation emitted from the body 16. As hereinbefore described, this wavelength of maximum intensity indicates the particular spectral curve and hence the particular temperature at which infrared energy is radiating from the body 16.

The timer 36, when gated off, generates a reset pulse which is transmitted to each of the gates 26 and 34 to enable recycling of the system.

The timer shown in FIG. 1 is of conventional design and may be of the nature of the commercially available scaler. The detector 18 may be a selenium infrared detector, a series photodiode infrared detector, a phototransistor infrared detector, or a photofield effect transistor detector. The gates 26 and 34 are of conventional bistable multivibrator design and the voltage comparator 32 is of conventional design to yield an output only when the voltage input changes polarity. The prism 10 may be manufactured from a material such as lithium fluoride which does not have sharp absorption bands in the infrared region and visible light region. Further, it is to be understood that means other than rotating prism 10 may be used to effect a continuous infrared spectrum of the energy radiated by body 16, for example, a diffraction grating.

It will readily be appreciated that the temperature of the body 16 may be ascertained according to the present invention as fast as scanning and recordation of the measured time intervals may be effected. The aforedescribed embodiment is capable of sampling the temperature of body 16 at a rate of sixty times per second, thereby providing an excellent response to changes in body temperature.

The embodiments of the invention in which an exclusive property or privilege is claimed are defined as follows:

1. A device for measuring the temperature of a body comprising means for generating a continuous spectrum of the infrared energy radiated by said body, means for scanning said continuous spectrum to generate a signal proportional to the intensity of the infrared radiation contained therein, means for differentiating said signal, and means for measuring the time of polarity reversal of said differentiated signal relative to the inception of said scan, which time relationship is a measure of the wavelength of the maximum-intensity infrared radiation contained in said continuous spectrum and hence the temperature of said body.

2. The device according to claim 1 wherein said scanning means, differentiating means and time-measuring means comprise a detector mounted to detect the intensity of infrared radiation within said continuous spectrum, a member interposed of said detector and said spectrum-generating means and having an aperture therethrough aligned and sized to admit a narrow wavelength band of said infrared radiation of said continuous spectrum to said detector, means for scanning said continuous spectrum of infrared radiation past the aperture of said member, differentiating means coupled to the output of said detector, and means for measuring the time of polarity reversal of the differentiated output signal of said differentiating means relative to the inception of said scan, which time relationship is a measure of said wavelength and hence the temperature of said body.

3. The device according to claim 2 wherein said spectrum-generating and scanning means comprise a rotatable prism interposed of said body and said member, and motor means for rotating said prism at a constant rate.

4. The device according to claim 3 wherein said differentiating and time-measuring means comprise an amplifier coupled to said detector, a differentiator coupled to the output of said amplifier, means for generating a first signal responsive to the polarity reversal of the differentiated output of said differentiator, means for generating a second signal responsive to the rotational position of said prism at the origin of said continuous spectrum, timing means, means responsive to said second signal for gating on said timing means and said amplifier, and means responsive to said first signal for gating off said timing means and said amplifier.

5. A device for measuring the temperature of a body comprising an infrared detector mounted to measure the intensity of infrared energy radiated from said body, means interposed of said body and said detector for generating a continuous spectrum of the infrared energy radiated from said body and scanning said spectrum over said detector, and means for measuring the time interval between inception of said scan and the maximum infrared energy intensity detected by said detector, which time interval is a measure of the temperature of said body.

References Cited

UNITED STATES PATENTS 3,222,930  12/1965  Smith _____ 73—355

FOREIGN PATENTS 172,092  12/1965  U.S.S.R.

OTHER REFERENCES

Broida, H. P., Experimental Temperature Measurements in Flames and Hot Gases, Chapter 17, in: Temperature—Its Measurement and Control in Science and Industry, American Inst. of Physics, vol. 2, Reinhold, New York, 1955, pp.. 282–3, QC–271–A6–C2.

Nutter, G. D., General Consideration Influencing the Design of a High-Accuracy Pyrometer, Chapter 54 in Part I, vol. 3 of Temp.—Its Movement and Control in Science and Industry, AIP, Reinhold, New York, 1962, p. 538, QC–271–A6–C2.

LOUIS R. PRINCE, Primary Examiner

F. SHOON, Assistant Examiner

U.S. Cl. X.R.

356—45